UNITED STATES PATENT OFFICE.

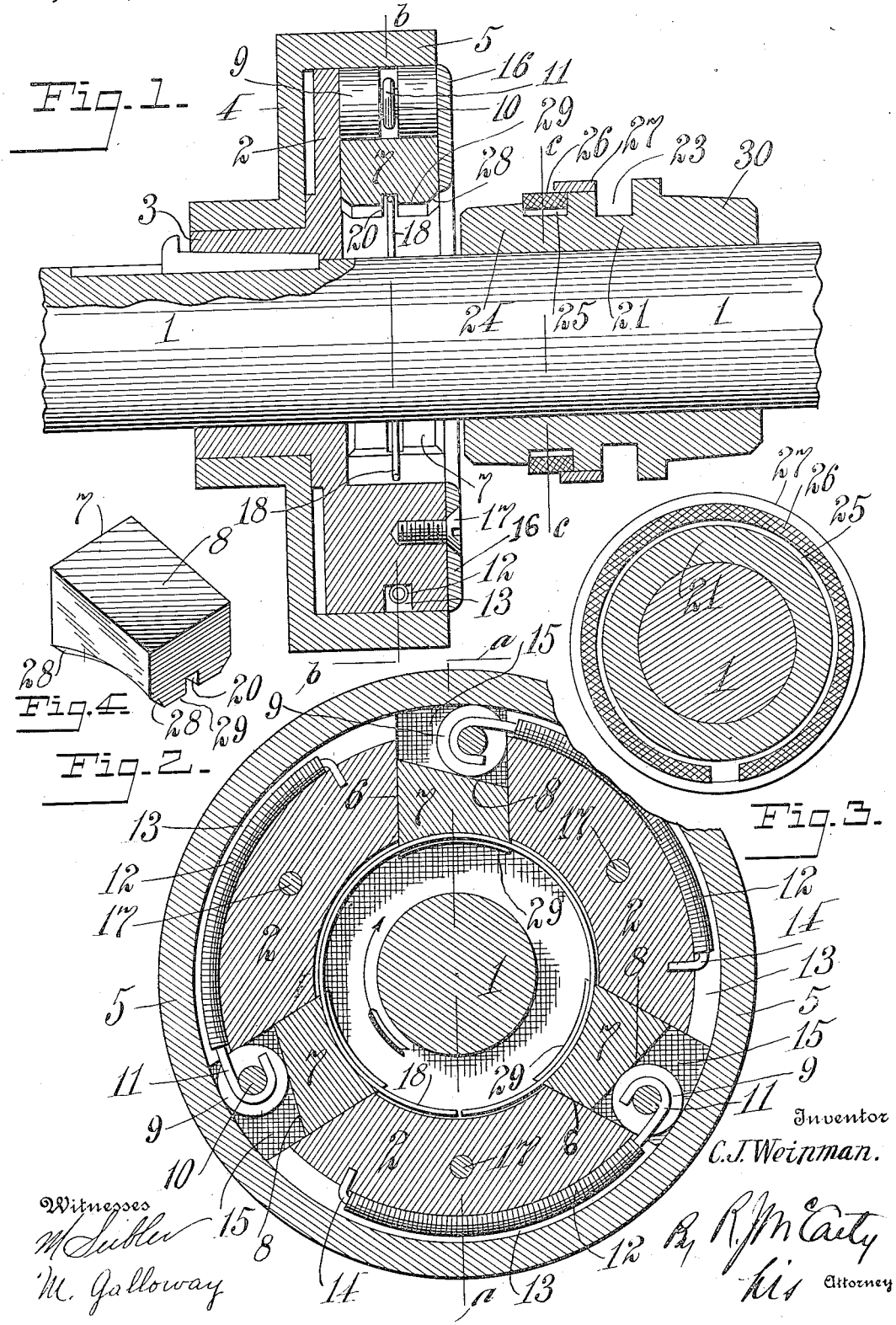

CHRISTIAN J. WEINMAN, OF DAYTON, OHIO.

CLUTCH.

1,052,866.     Specification of Letters Patent.     Patented Feb. 11, 1913.

Application filed February 28, 1912. Serial No. 680,529.

*To all whom it may concern:*

Be it known that I, CHRISTIAN J. WEINMAN, citizen of the United States, residing at Dayton, in the county of Montgomery and State of Ohio, have invented certain new and useful Improvements in Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in clutches.

The object of the invention is to provide a simple and effective clutch which may be set gradually and without throwing excessive strains on the clutch or the mechanism driven thereby.

Another object of the invention is to provide a clutch that may be easily set or adjusted to drive in either direction.

Referring to the accompanying drawings, Figure 1 is a longitudinal sectional elevation of my improved clutch, on the line $a-a$ of Fig. 2. Fig. 2 is a section on the line $b-b$ of Fig. 1. Fig. 3 is a section on the line $c-c$ of Fig. 1; and Fig. 4 is a perspective view of one of the incline blocks.

Referring more particularly to the drawings, 1 represents a driving shaft to which is keyed a revolving member 2. Journaled on the hub 3 of the revolving member 2, or directly upon the shaft 1, is a driven member 4 provided with a flange 5 which incases the revolving member 2. The said revolving member 2 is provided with a suitable number of radial openings 6 which receive sliding blocks 7 having tapered or inclined faces 8. The said blocks 7, and the flange 5 form wedge shaped pockets 15 within which are placed rollers 9 provided with stems 10 which receive hooks 11. The hooks 11 are attached to one end of springs 12 which lie in peripheral grooves 13 in said revolving member 2, the other ends of said springs 12 being attached to the revolving member 2 at 14. The said springs 12 are adapted to normally maintain the rollers 9 in the larger ends of the pockets 8. The rollers 9 and the blocks 7 are prevented from moving laterally out of the pockets 6 and 15 by an annular plate 16 attached to the member 2 by screws 17. The blocks 7 are normally maintained in engagement with the rollers 9 when the clutch is not set, by a suitable spring 18 which lies in grooves 20 in the inner faces 29 of said blocks. Outward force is exerted on the blocks 7 to cause the rollers 9 to ride up the incline surfaces 8 and to become wedged between the blocks and the flange 5, and to thereby cause the driving and driven members to rotate in unison. This is accomplished by the following means: Slidingly mounted on the shaft 1 is a shifter or sleeve 21 provided with a peripheral groove 23 for the connection of a shifting lever (not shown) and by means of which said sleeve is shifted. The said sleeve 21 is provided with a cylindrical portion 24 which slightly tapers and has a groove 25 adapted to receive an annular spring 26 held thereon by an overlapping ring 27. The blocks 7 are provided with inner tapered surfaces 28 adapted to be engaged by the spring 26. When the sleeve 21 is shifted, the said spring 26 will engage the surfaces 28, thereby causing said spring to compress and causing the same to ride onto the inner faces 29 of the blocks 7. This takes place during the continued movement of the sleeve 21. When in this position, the spring 26 exerts a force against the blocks 7 sufficient to produce enough friction between the blocks 7, rollers 9 and flange 5, to cause the rollers 9 to roll on the inclined faces of the blocks. This movement of the rollers 9 will move the blocks 7 inwardly against the tension of the spring 26 and in contact with the cylindrical portion 24 of the shifting sleeve. The rollers 9 will move along the incline surfaces of the blocks until they become jammed in the wedge shaped pockets 15, at which time the driving and driven members will rotate in unison. The spring 26 permits the sleeve 21 to be thrown in quickly, and at the same time permits the two members of the clutch to be connected gradually. Under some conditions of operation, it may be desirable to eliminate the spring 26, in which case the sleeve 21 is provided with a conical end 30 adapted to engage the blocks 7 when said sleeve is reversed. It is to be noted, that, when the driven member 4 is retarded, the relative movement between the driving and driven members will cause the rollers 9 to roll farther into the pockets 15, thereby causing a closer binding between the two members. When it is desired to release the clutch, the sleeve 21 is thrown away from the blocks. To permit the cylindrical portion thereof to be easily disengaged from the blocks, the periphery of said portion is made slightly tapered, as before stated. When the sleeve is released, the pressure against the rollers 9 will be relieved, thus permitting the springs 12 to draw said rollers back into the large end of the pockets 15.

It will be seen, that the construction of the clutch is such that the wear on the rollers and blocks will be compensated for by the inclined surfaces 8 of said blocks.

Either the revolving member 2 or the member 4 may be the driving member, but the clutching action is only secured for one direction of rotation of the driving member. However, it will be seen that, if the blocks 7 and the springs 12 be reversed, the driving member can rotate the clutch in the opposite direction.

The flange 5 of the driven member may be in the form of a pulley, and the hub of the driven member may receive a gear, or the said driven member may be connected to the mechanism to be driven by any well known means.

Without limiting myself to mere details of construction which may be varied without departing from the essential features of my invention, I claim:

1. A clutch comprising driven and driving members, one of said members being provided with a groove on its outer periphery and with a plurality of radial openings, sliding blocks having outer tapered sides lying within the inner portions of said openings, rollers mounted in said openings and in engagement with said tapered sides, resilient members secured to the grooved member and to the rollers and lying in said groove, said resilient members adapted to hold said rollers normally in contact with the lower portions of the tapered sides of said blocks, and a shifting member adapted to engage the inner sides of said blocks to move them outwardly, whereby the rollers are caused to roll upon the tapered surfaces of said blocks to clutch the driving and driven clutch members when said grooved member is rotated.

2. A clutch comprising driven and driving members, one of said members being provided with a plurality of radial openings, sliding blocks having outer tapered sides lying within the inner portions of said openings, rollers mounted in said openings and in engagement with said tapered sides, resilient members secured to the member provided with said openings and to said rollers, said resilient members adapted to hold said rollers normally in contact with the lower portions of the tapered sides of said blocks, an annular resilient member engaging said blocks and normally holding said blocks in said openings, and a shiftable member adapted to engage the inner sides of said blocks to move them outwardly, whereby the rollers are caused to move up the tapered surfaces of said blocks to clutch the driving and driven clutch members when one of said members is rotated.

3. The combination with the driving and driven members of a clutch, said driving member having openings therein, of sliding blocks provided with tapered outer faces mounted in said openings and forming a series of radial pockets the bottoms of which are the tapered faces of said blocks, means for maintaining said blocks in said openings, rollers mounted in said pockets and resting upon the tapered bottoms thereof, resilient members holding said rollers normally in contact with the lower surfaces of the bottoms of said pockets, and a slidable shifting member having rigid and elastic portions adapted to engage the inner sides of said blocks to move them outwardly and to thereby cause the rollers to ride up the tapered bottoms of said pockets and to unite the two clutch members.

4. The combination with the driving and driven members of a clutch, one of said members having openings therein, of sliding blocks provided with tapered outer faces mounted in said openings and forming a series of radial pockets the bottoms of which are the tapered faces of said blocks, means for maintaining said blocks in said openings, rollers mounted in said pockets and resting upon the tapered bottoms thereof, resilient members holding said rollers normally in contact with the lower surfaces of the bottoms of said pockets, an annular resilient member adapted to press said blocks against said rollers to cause them to engage the said rollers to cause them to engage the driven member of the clutch, and a shiftable driven member carrying said annular resilient member and adapted to be engaged by said member when said rollers roll upon said tapered faces thereof.

In testimony whereof I affix my signature, in presence of two witnesses.

CHRISTIAN J. WEINMAN.

Witnesses:
R. J. McCARTY,
MATTHEW SIEBLER.